US006163955A

United States Patent [19]

Tsai

[11] Patent Number: 6,163,955

[45] Date of Patent: Dec. 26, 2000

[54] TUBE EXPANDING MACHINE

[76] Inventor: Ching Yuan Tsai, P.O. Box 63-99, Taichung, Taiwan, 406

[21] Appl. No.: 09/400,701

[22] Filed: Sep. 20, 1999

[51] Int. Cl.[7] ...................................................... B23P 15/26

[52] U.S. Cl. ................. 29/727; 29/890.044; 29/890.046; 29/715

[58] Field of Search ....................... 29/890.044, 890.046, 29/890.053, 523, 715, 727; 72/370.06, 370.07

[56] References Cited

U.S. PATENT DOCUMENTS 3,507,026 4/1970 Collins .
4,459,917 7/1984 Michael et al. .
4,584,751 4/1986 Gray et al. .
5,099,677 3/1992 Tokura .
5,640,879 6/1997 Damsohn et al. .

*Primary Examiner*—I Cuda

[57] ABSTRACT

A machine includes a casing disposed in a housing for receiving one or more tubes and a number of fins engaged around the tubes. A frame is slidably received in the housing, and one or more rods are secured to the frame and moved to engage into and to expand the tubes to engage with the fins when the rods are moved toward the tubes. A bracket and a seat have one or more pipes slidably received in the barrels for slidably receiving the rods and for preventing the rods from being bent. The rods each includes a mold piece for further expanding the tubes.

7 Claims, 6 Drawing Sheets

10
20
21
11
12
121
13
14
17
18
15
222
221
22
161
16

TUBE EXPANDING MACHINE

BACKGROUND OF THE INVENTION

1. Field of the Invention

The present invention relates to a machine, and more particularly to a machine for expanding tubes.

2. Description of the Prior Art

Typical tube expanding machines may be used for expanding tubes only. For heat exchanging tubings, a number of fins may be attached onto the tubes for increasing the heat exchanging areas. However, the fins may not be effectively fixed onto the tubes with the tube expanding machine.

The present invention has arisen to mitigate and/or obviate the afore-described disadvantages of the conventional tube expanding machines.

SUMMARY OF THE INVENTION

The primary objective of the present invention is to provide a machine for effectively expanding the tubes and for attaching the fins onto the tubes.

In accordance with one aspect of the invention, there is provided a machine comprising a housing including an upper portion and a lower portion, a casing disposed in the lower portion of the housing, at least one tube received in the casing, a plurality of fins received in the casing and engaged around the tube, a frame slidably received in the housing, at least one rod including a first end secured to the frame and moved in concert with the frame, and including a second end having a head provided thereon, and means for moving the frame upward and downward in the housing. The head of the rod is moved to engage into the tube and to expand the tube to engage with the fins when the frame and the rod are moved toward the tube.

A device is further provided for slidably receiving and protecting the rod and includes a bracket retractably secured to the frame, the bracket includes at least one pipe extended therefrom for slidably receiving the rod. A seat is further provided and coupled to the bracket with a first actuator. The seat includes at least one barrel extended therefrom for slidably receiving the pipe of the bracket.

The moving means includes a second actuator coupled between the frame and the housing, the machine further includes a first microswitch for engaging with the second actuator and for actuating the first actuator and for allowing the bracket to be moved toward the seat. A second microswitch is further provided for engaging with the second actuator and for stopping the second actuator. A moving device is further provided for moving the seat away from the tube and the casing.

The rod further includes a mold piece provided hereon for engaging with the tube and for further expanding the tube. The housing includes at least one post provided therein, the frame is slidably engaged on and guided to move along the post.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
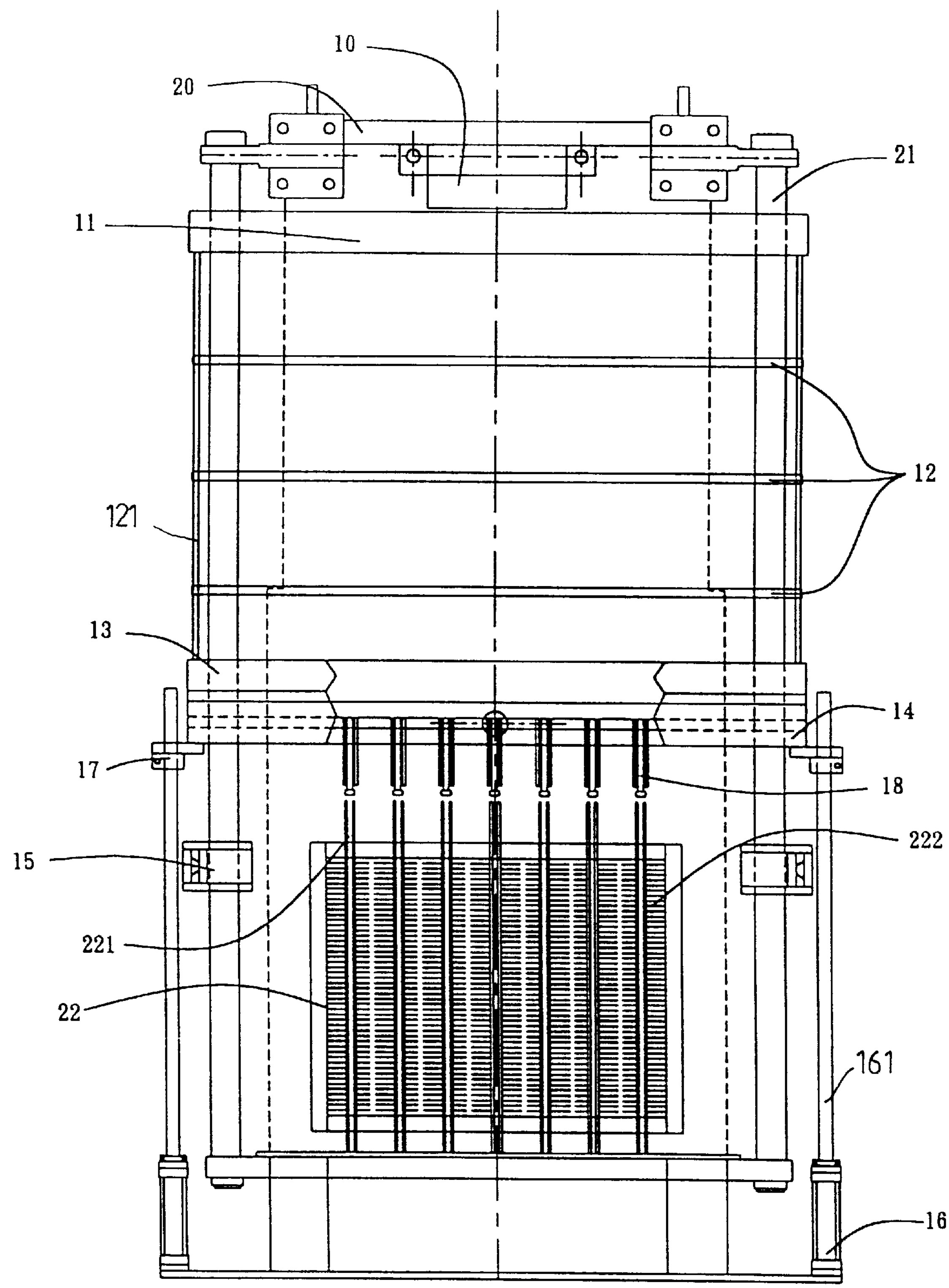
FIG. 1 is a front view of a tube expanding machine in accordance with the present invention.
Figure 2:
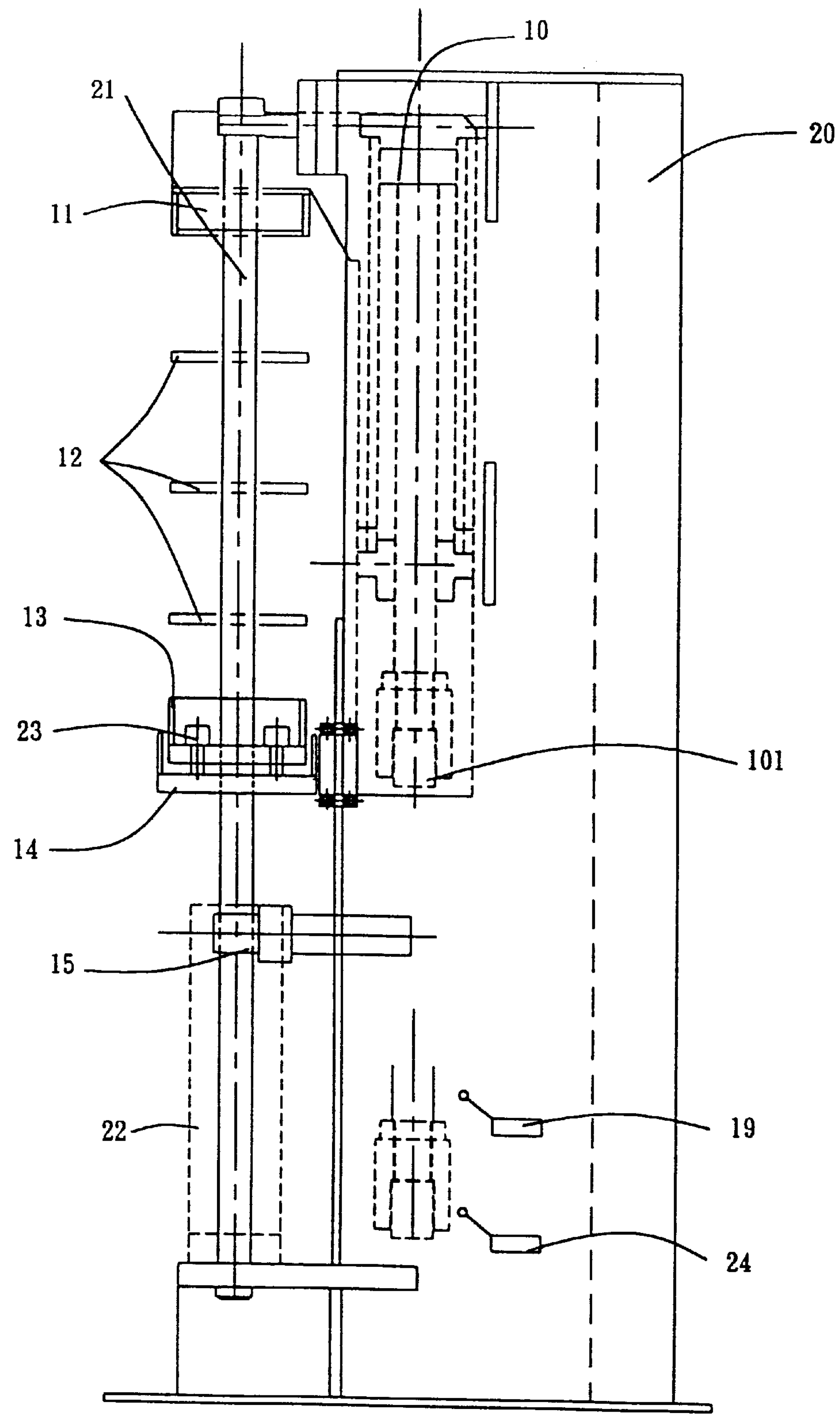
FIG. 2 is a side view of the tube expanding machine.
Figure 3:
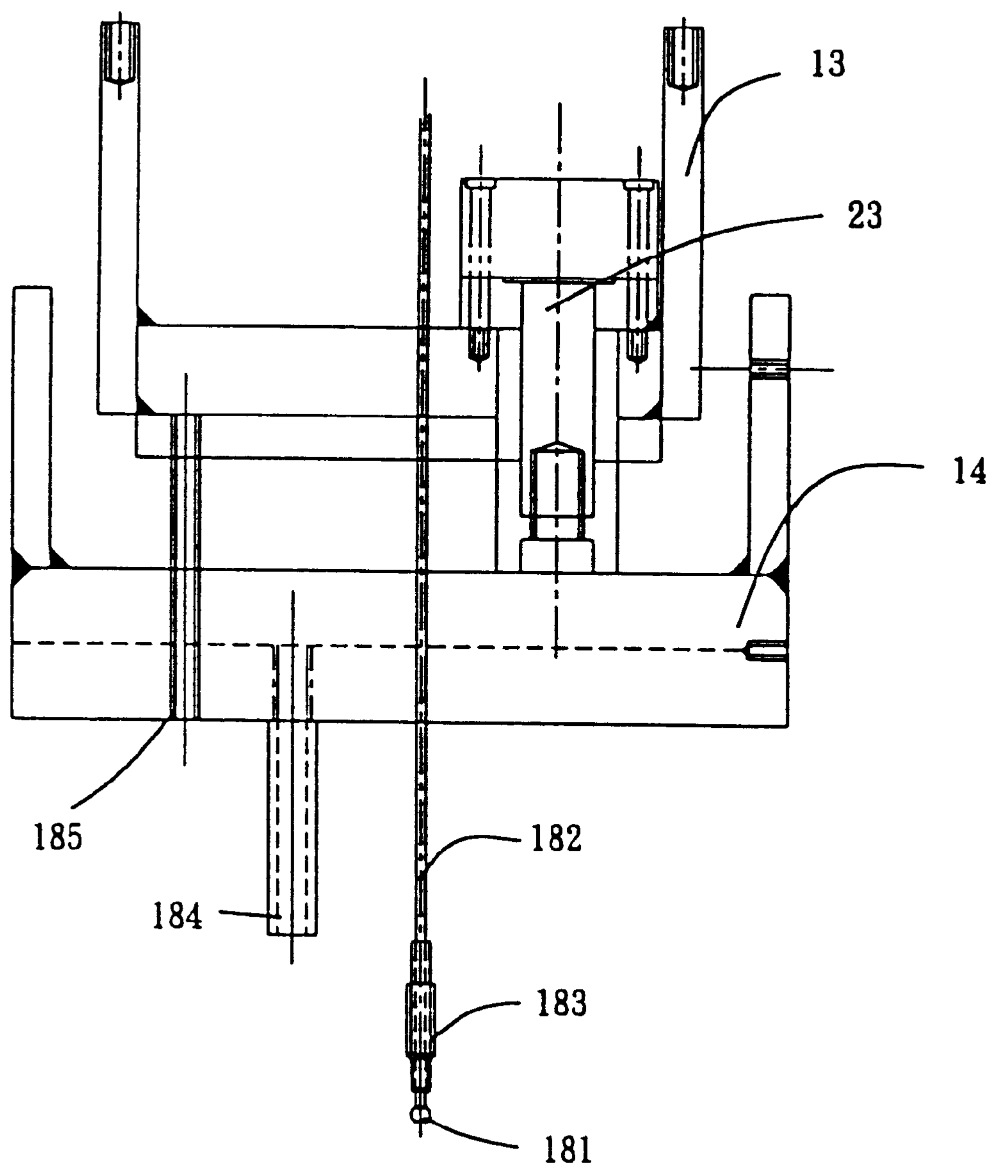
FIG. 3 is an enlarged partial schematic view illustrating the tube expanding device of the tube expanding machine.

Referring to the drawings, and initially to FIGS. 1–3, a tube expanding machine in accordance with the present invention comprises a housing 20 including one or more posts 21 vertically provided therein, and including an actuator 10 secured in the upper portion thereof, and including two microswitches 19, 24 provided in the lower portion thereof. One or more blocks 15 are secured onto the lower portions of the posts 21 respectively. The actuator 10 includes a lower portion 101 for engaging with the microswitches 19, 24 and for controlling the operations of the machine. One or more actuators 16 are disposed on the bottom portion of the housing 20 and each includes a beam 161 extended upward therefrom, and each includes a stop 17 secured on the upper portion of the beam 161. A casing 22 is disposed in the lower portion of the housing 20. One or more tubes 221 are engaged through the casing 22 and a number of fins 222 are disposed around the tubes 221 and to be secured onto the tubes 221.

Figure 4:
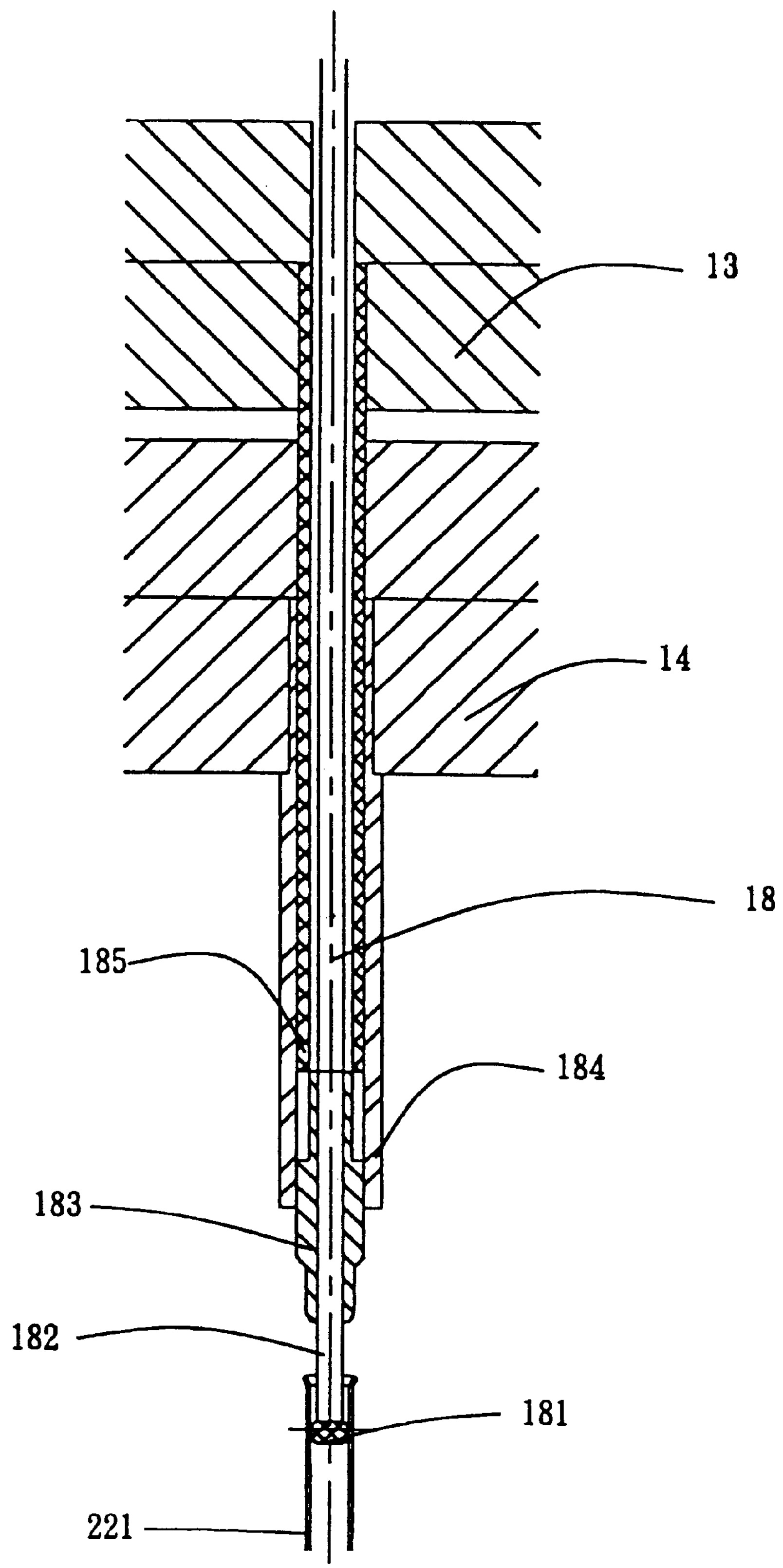
FIG. 4 is an enlarged partial cross sectional view of the tube expanding device of the tube expanding machine.
Figure 5:
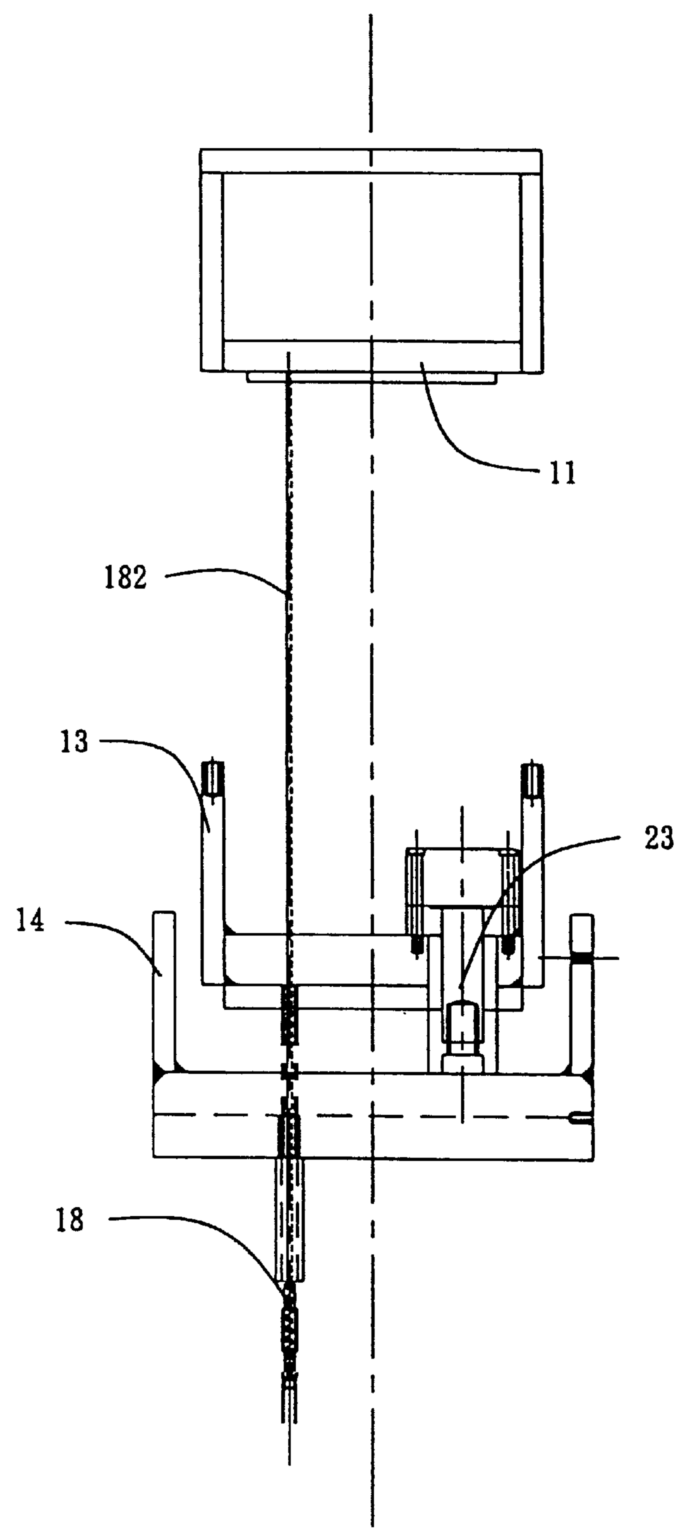
FIGS. 5 and 6 are enlarged partial schematic view illustrating the operation of the tube expanding device of the tube expanding machine.

A frame 11 is slidably received in the housing 20 and is preferably guided to slide up and down along the posts 21, and is coupled to the actuator 10 so as to be moved up and down by the actuator 10. A bracket 13 and one or more plates 12 are secured in the frame 11 by such as one or more extendible or retractable poles 121, and moved in concert with the frame 11. A seat 14 is slidably coupled to and guided to slide up and down along the posts 21. One or more actuators 23 are coupled between the bracket 13 and the seat 14 for selectively separating the bracket 13 and the seat 14 from each other and for allowing the seat 14 to be moved in concert with the bracket 13 by the actuator 10. The seat 14 includes one or more barrels 184 extended downward therefrom (FIGS. 3, 4). The bracket 13 includes one or more pipes 185 extended downward therefrom and slidably engaged in the barrels 184 of the seat 14 respectively. One or more rods 182 each includes an upper end secured to the frame 11 (FIGS. 5, 6) and moved in concert with the frame 11, and each includes a head 181 and a mold piece 183 provided on the bottom portion thereof (FIGS. 3, 4). The head 181 includes a size smaller than that of the mold piece 183, best shown in FIGS. 3 and 4.

Figure 6:
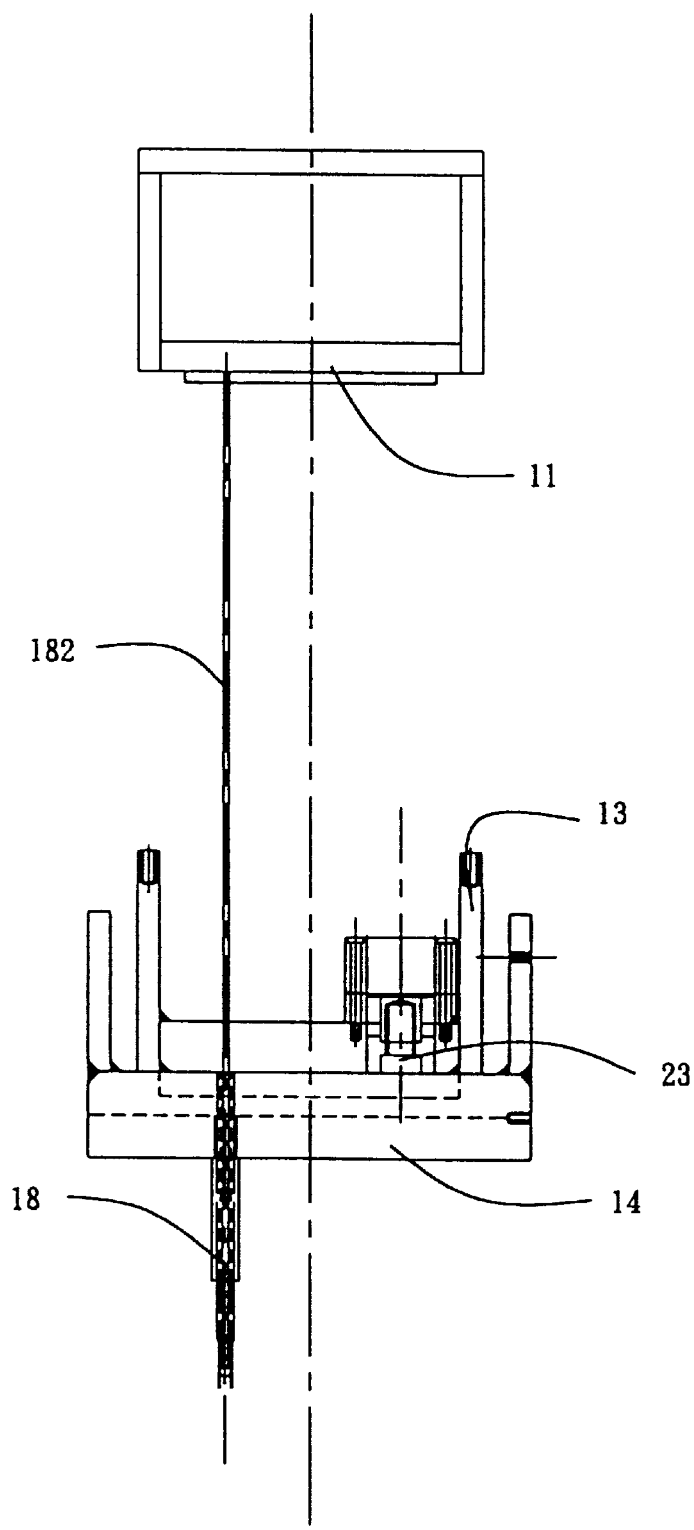

In operation, as shown in the drawings, the frame 11 and the bracket 13 and the seat 14 and the rods 182 may all be moved downward by the actuator 10 until the seat 14 contacts with the stops 17 (FIG. 1) which may support the seat 14 and the other members at this position. When the frame 11 is further actuated downward by the actuator 10, the rods 182 may further be moved downward by the actuator 10 via the frame 11 and the heads 181 may be engaged into the tubes 221 for expanding the tubes 221 (FIG. 4) and for forcing the tubes 221 to engage with the fins 222. The frame 11 may move downward relative to the bracket 13 and the seat 14 due to the retraction of the retractable poles 121. When the lengths of the tubes 221 are almost completely expanded by the head 181, the lower portion 101 of the actuator 10 will actuate the microswitch 19 to release the actuator(s) 23 for allowing the bracket 13 to be moved toward and to engage with the seat 14 (FIG. 6). The pipes 185 of the bracket 13 may moved through the barrels 14 of the seat 14 to engage with and to force the mold pieces 183 to further expand the tubes 221, particularly to expand one end portions of the tubes 221 to a greater size than the other portion thereof. The actuators 16 may also be released when the lower portion 101 of the actuator 10 actuates the microswitch 19 such that the seat 14 may be moved downward. When the seat 14 contacts the blocks 15, the lower portion 101 of the actuator 10 may also actuate the microswitch 24 in order to stop the actuator 10. The actuators 16 may then elevate the seat 14, and the actuators 23 may move the bracket 13 upward away from the seat 14, and the actuator 10 may move the members upward to the initial position.

The barrels 184 and the pipes 185 are provided for slidably receiving the rods 182 and for preventing the rods 182 from being bent. The movement of the bracket 13 toward the seat 14 allows the pipes 185 to further force the mold pieces 183 to further expand the tubes 221 without disengaging the tubes 221 from the casing 22, such that the tubes 221 may be maintained in a precise position to align with the rods 182 and such that the tubes 221 may be prevented from being distorted by the heads 181 and/or the mold pieces 183 inadvertently.

Accordingly, the machine in accordance with the present invention may be used for effectively expanding the tubes and for attaching the fins onto the tubes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A machine comprising:

a housing including an upper portion and a lower portion, a casing disposed in said lower portion of said housing, at least one tube received in said casing, a plurality of fins received in said casing and engaged around said at least one tube, a frame slidably received in said housing, at least one rod including a first end secured to said frame and moved in concert with said frame, and including a second end having a head provided thereon, means for moving said frame upward and downward in said housing, said head of said at least one rod being moved to engage into said at least one tube and to expand said tube to engage with said fins when said frame and said at least one rod are moved toward said at least one tube, a bracket retractably secured to said frame, said bracket including at least one pipe extended therefrom for slidably receiving said at least one rod, a seat including at least one barrel extended therefrom for slidably receiving said at least one pipe of said bracket, and at least one first actuator coupling said seat to said bracket.

2. The machine according to claim 1 further comprising means for slidably receiving and protecting said at least one rod.

3. The machine according to claim 1, wherein said moving means includes a second actuator coupled between said frame and said housing, said machine further includes a first microswitch for engaging with said second actuator and for actuating said at least one first actuator and for allowing said bracket to be moved toward said seat.

4. The machine according to claim 3 further comprising a second microswitch for engaging with said second actuator and for stopping said second actuator.

5. The machine according to claim 1 further comprising means for moving said seat away from said at least one tube and said casing.

6. The machine according to claim 1, wherein said at least one rod further includes a mold piece provided thereon for engaging with said at least one tube and for further expanding said at least one tube.

7. The machine according to claim 1, wherein said housing includes at least one post provided therein, said frame is slidably engaged on and guided to move along said at least one post.

* * * * *